United States Patent [19]

Galanty et al.

[11] Patent Number: 5,074,996
[45] Date of Patent: Dec. 24, 1991

[54] TELESCOPICAL BAR SCREEN RAKING SYSTEM

[75] Inventors: William B. Galanty, Short Hills; Joseph Kennedy, Emerson, both of N.J.

[73] Assignee: Franklin Miller, Inc., Livingston, N.J.

[21] Appl. No.: 567,641

[22] Filed: Aug. 15, 1990

[51] Int. Cl.⁵ .......................................... B01D 29/64
[52] U.S. Cl. ................................ 210/141; 210/159; 210/162; 210/413
[58] Field of Search .............. 210/159, 162, 141, 413; 212/266–269; 52/118

[56] References Cited

U.S. PATENT DOCUMENTS 4,917,796  4/1990  Rudzinski ............................ 210/159

FOREIGN PATENT DOCUMENTS 2103739  7/1979  Fed. Rep. of Germany ...... 210/159
3312  1/1985  Japan .................................. 210/162
2044624  10/1980  United Kingdom ............... 210/159

Primary Examiner—W. Gary Jones
Assistant Examiner—Matthew O. Savage
Attorney, Agent, or Firm—Clay Holland, Jr.

[57] ABSTRACT

Improved bar screen raking systems are provided with telescopical boom members, forming the rake arm controlling displacement up and down, in combination with a hydraulic piston rod cylinder, controlling displacement in and out. In one embodiment the raking system includes a telescopical rake arm boom comprising a boom member supporting a bearing slide and ball carrier, a cam follower and track arrangement in fixed spaced apart parallel disposition on opposing sides along the length of said boom, a boom side member connected to said bearing and cam arrangements for carrying a rake, a hydraulic piston driven cable device fixedly supported by said boom and parallel to said bearing slide and cam follower arrangements for controlling boom displacement up and down and a hydraulic piston rod cylinder device for controlling boom displacement in and out. In a second embodiment a raking system includes a telescopical rake arm boom comprising outer stationary axially disposed members, an inner axially disposed cylindrical telescopable member having a rake connected to one end and connected at the other end to an axially disposed ball screw arrangement for controlling displacement of said boom and rake up and down, and a hydraulic piston rod cylinder device for controlling boom displacement in and out.

13 Claims, 8 Drawing Sheets

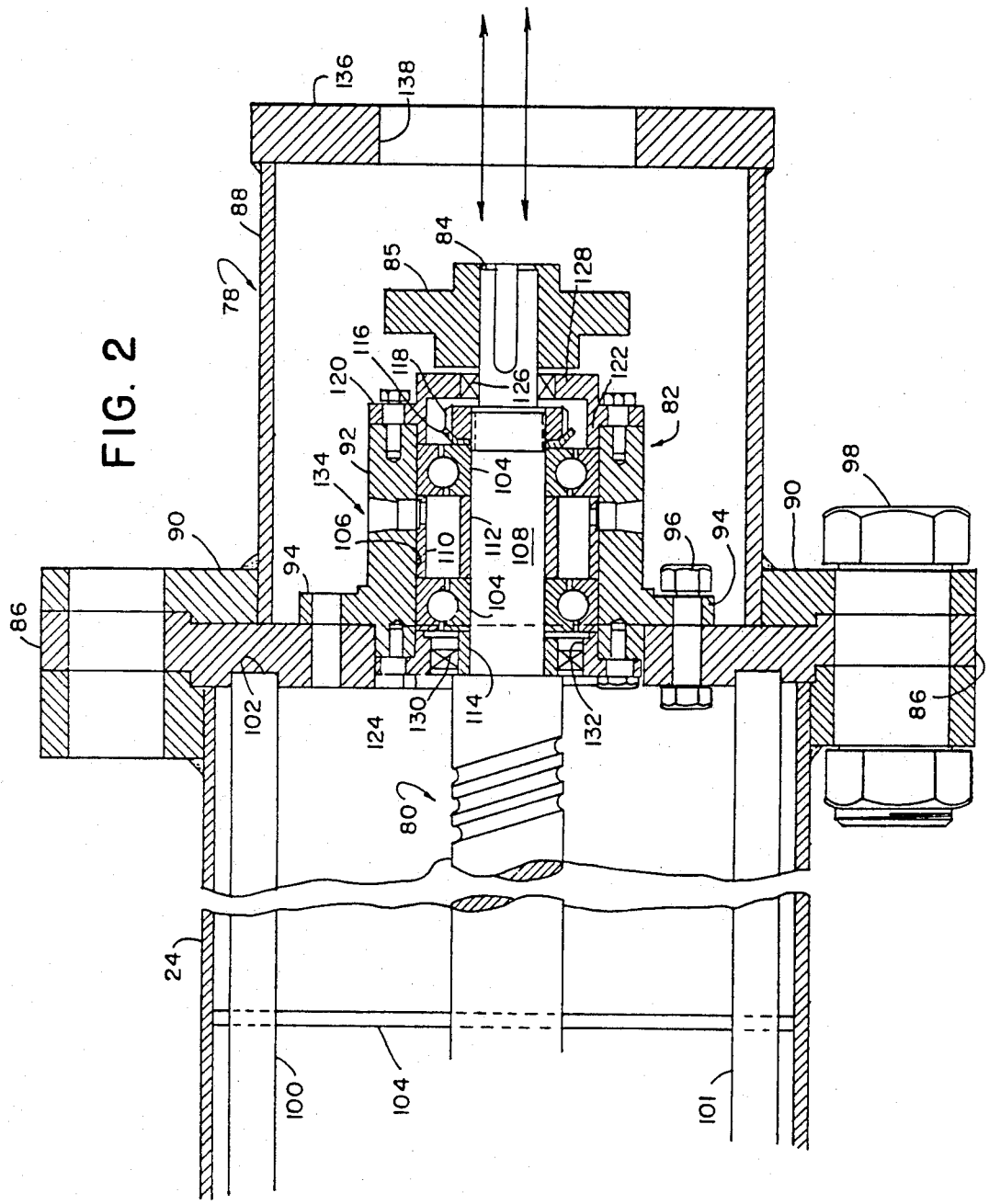

TELESCOPICAL BAR SCREEN RAKING SYSTEM

FIELD OF THE INVENTION

The present invention relates to the field of bar screen clearing and raking systems in which a raking arm carrying a rake device at a remote end thereof is displaced up and down along the length of the screening device disposed transverse to intake passageways for fresh water, waste water purifying plants and the like applications to remove obstructing objects and debris which may be trapped or obstructing the flow of water through such passageways and screening devices disposed at such intakes.

BACKGROUND OF THE INVENTION

In the prior art relating to raking machines and systems, such raking devices may be required to travel over long distances along a vertical or slightly inclined path, in close contact with a grate comb or bar screen, from the bottom of a water intake inlet to an emptying position above the grate or screen where collected debris is discharged or removed from the raking device during repetitious cycles. Under such operating conditions the base of the rake device may be mounted at ground level, e.g. above water surface level, while the longitudinal length of the raking mechanism may extend, both below and above such ground level. The environmental and climatical conditions in the region where such raking devices operate have dictated specification requirements for reliable operation of such devices, and few, if any prior art devices appear to be capable of meeting such requirements owing to the un reliability of the drive mechanisms used heretofore in such prior art devices. For example, where the device is utilized in a sheltered inhouse application the requirements are less stringent than when such devices ar utilized in an out-of-doors hostile near freezing temperature.

One prior art machine of the type to which the present invention relates is disclosed in U.S. Pat. No. 3,591,006, entitled "RAKING CLEANING TOOL", issued July 6, 1971, to Ignaz Daferner et al, which disclose means of guide tracks and driving gears coupled thereto for up and down motion along such track having a reversed portion at the bottom ends thereof whereby a continuous path of movement results from the driving gears. Another prior art example, is disclosed in U.S. Pat. No. 3,909,411, entitled "GRATE RAKE FOR CLEANING A GRATE ARRANGED IN A WATER CONDUIT", issued Sept. 30, 1975, to Eduard Angele, et al, which discloses the movements of a rake comb by an articulated arrangement of two cylinder piston units which are so arranged as to cause the rake to move in an arcute path as the rake comb travels the full length of the grate bars to remove accumulated materials on the grate. A third prior art device is disclosed in U.S. Pat. No. 4,222,878, entitled "RAKING EQUIPMENT FOR TRASHRACKS", issued Sept. 16, 1980, to Hans Hansson, which discloses two tube members being telescopically displaceable in parallel relation to each other and connected to each other by a block means, with pulleys and wires arranged at an upper end of each tube member to provide means for up and down displacement of one of the tubes with respect to the other tube which is fixed to a support frame.

The foregoing prior art devices and many others, fail to provide raking systems which are reliable for operation in harsh near freezing climatical conditions or regions, and also are not capable of avoiding damage to the up and down motion of the raking arm which may be caused by the raking arm encounting a large obstruction from objects which may become lodged in the grating comb or bar screen as the rake traverses its up and down path along the grate or screen.

Therefore, it is an object of the present invention to provide a raking system that is mechanically, hydraulically and electrically rugged and reliable for automatic continuous or intermitten manual operation in harsh near freezing climatical conditions or regions.

Another object of the present invention is the provision of a raking system which automatically overrides and by-passes large objects which may become lodged in a grating comb or bar screen so as to prevent damage to the raking means.

Yet another object of the present invention is the provision of a raking system whose mode of operation is controlled automatically by programmable computer logic circuits or by manually initiated instructions.

Still another object of the invention is the provision of a raking system which has fewer and more reliable actuating means for driving a raking arm up and down along its raking lengths which may be extensive.

While another object of the invention is the provision of a raking system in which a single worm screw device actuates and controls the displacement of a rake arm or boom in its extension and retraction motion.

While still another object of the present invention is the provision of a raking system in which a single cylinder piston actuated cable device actuates and controls the displacement of a rake arm in its extension and retraction motion.

While yet another object of the invention is the provision of a raking system in which the raking stroke may be in excess of twenty feet.

SUMMARY OF THE INVENTION

The present invention is directed to an improved bar screen raking system encompassing two primary embodiments, which comprise a telescopical boom, forming a rake arm for controlling displacement up and down along a bar screen, in combination with at least one hydraulic piston rod cylinder for controlling displacement of the rake arm in and out from the screen. In what may be considered the preferred embodiment of the invention, the raking system includes an outer stationary axially disposed member for securing a drive end of a ball screw arrangement, an inner coaxial telescopicable boom member having a rake connected to the externally projecting rake end thereof, while the internal end thereof is connected to the other end of the axially disposed ball screw arrangement, which is utilized to control the up an down displacement of the boom and rake, and a hydraulic piston rod cylinder for boom displacement laterally. In the other embodiment of the invention, the up and down displacement of the rake is accomplished by a drive hydraulic piston cylinder which displaces a cable connected to opposite ends of the internal piston member of the hydraulic cylinder to thereby move the cable linearly back and forth along the entire length of the cylinder. The opposite ends of the cable exterior to the cylinder are each fixedly connected to a section of a moveable rake carriage arrangement to provide smooth and efficient displacement of the rake carriage. Both embodiments utilize a hydraulic actuation system and a programmable computerized electronic circuitry system to provide either fully automated or manual operation of the raking systems.

BRIEF DESCRIPTION OF THE DRAWINGS

FIG. 2 is a cross-sectional view of the raking system shown in FIG. 1, in the encircled broken line area designated by the letter "A" therein, showing the drive end of an enclosed ball screw device of the system;

DETAILED DESCRIPTION OF THE INVENTION

Figure 1:
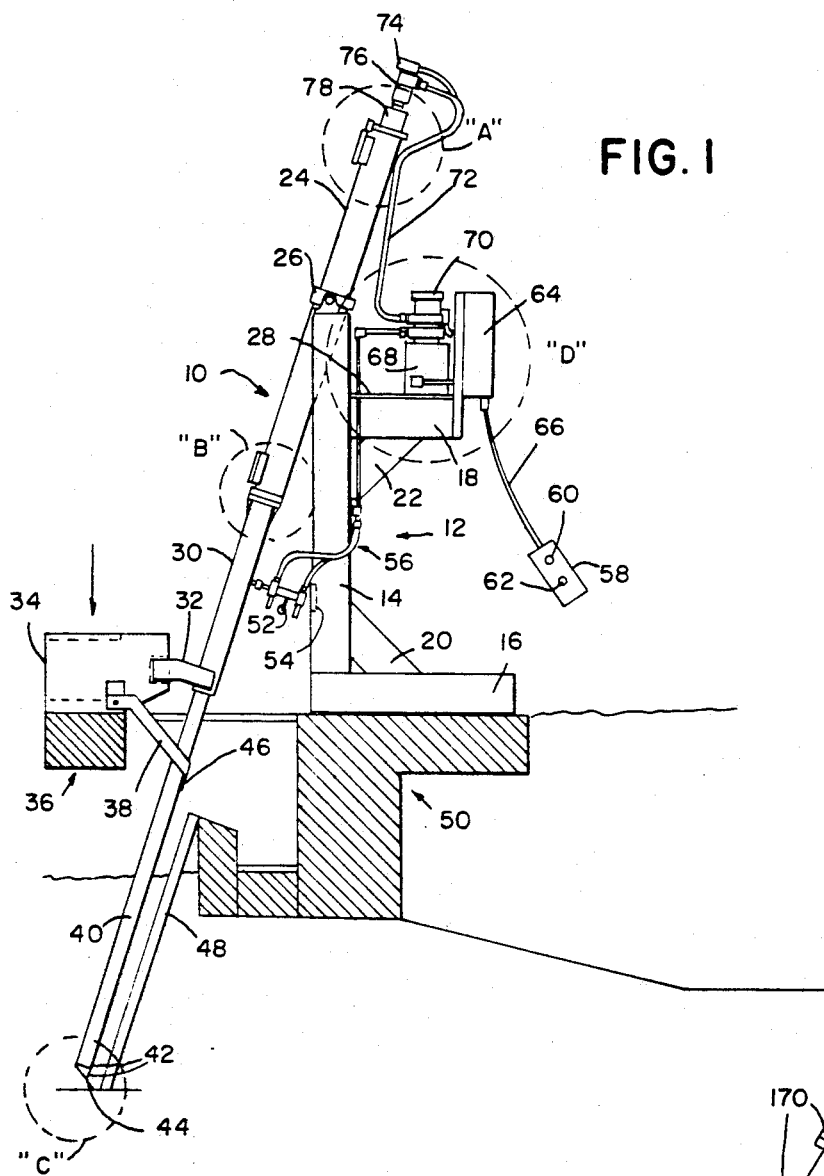
FIG. 1 of the drawings is a pictorial side view of a bar screen raking system illustrating its installation for full operation in a typical water utility plant, as an example.

Referring now to FIG. 1, there is shown a bar screen raking system 10 which includes a support structure 12 that consist of a pair of lower base structure horizontal members 16 and a pair of upper structure horizontal members 18 supported by a pair of upper bracing structure members 22. As shown bracing members 20 are connected between members 14 and 16, while bracing members 22 are connected between 14 and 18. As can readily be seen, members 16 are disposed at ground level and function as the main base anchoring members of support structure 12. Members 18 are seen as support members for the hydraulic and electrical devices of the system shown within the encircled broken line area designated by the letter "D". Horizontal members 18 are connected together by a horizontal support plate 28.

Continuing with the description of FIG. 1, there is shown a cylindrical rake boom member 24 connected to the top of vertical support structure members 14 by a pivotable trunion clamp means 26 which supports member 24 about midway its length, so as to permit it to pivot back and forth at the points of support between horizontally disposed trunion 26 and vertical support members 14. A bearing support tube 30 is connected to the remote end of boom member 24 and extends coaxially therewith. Lateral movement of the boom is restricted by a boom stabilizer plate 32 which is connected to tube 30 near its remote end, and plate 32 is disposed between a pair of spaced apart parallel plates 34 that are attached to a base pad 36 where they are fixedly disposed. Boom stabilizer plate 32 is free to move between plates 34 as tube 30 moves laterally. As shown in FIG. 1, there are a pair of scraper blade arms 38 connected to the bottom of parallel plates 34 and project and extend outwardly and downwardly toward the boom member tube 30.

A third boom member of ram 40 extends coaxially from the remote end of bearing support tube 30 and extends to the bottom of intake passageway below the water level. As ram 40 extends downward it passes between scraper blade arms 38 and terminates with a rake holder 42 and a blade 44 connected thereto. A scraper blade 46 is connected to scraper blade arms 38 at their remote ends, while the other ends of arms 38 are pivotally connected to the base plates 34. In operation when scraper blade 46 comes in contact with rake blade 44, scraper blade 46 slides along the rake blade 44 length under gravitational force and pushes any debris therefrom which it may be carrying as ram 40 moves upwards along a rake-grate or screen 48 which is disposed along the up and down path of ram 40. As shown in FIG. 1, the upper end of grate 48 extends above the water level and is disposed adjacent a receiving device which may be an integral part of a support foundation and debris removal system designated 50. Also shown in FIG. 1, is a hydraulic piston rod cylinder device 52 which is connected at one end to a support plate 54 connected between support members 14 and to tube 30 at the other end. Cylinder 52 is actuated by hydraulic fluids delivered through hydraulic supply hoses 56.

As shown in FIG. 1, there is a hand held electrical control device 58 with control switches 60 and 62 which is an electrically connected to an electrical control and power source device 64 by an electrical cable 66. Electrical device 58 is used for manual operation of the system when desired. The electrical control and power source 64 is also connected to a hydraulic fluid source 68 and pumping system 70, which in combination are used to control the flow of hydraulic fluids through hydraulic supply hoses 56 and 72, and throughout the system. Hydraulic fluids which flow through hoses 72, are used to actuate a hydraulic brake 74 and drives a motor 76, that in turn drives a coupling device 78 which powers ram 40 and causes up and down displacement of ram 40.

Referring now to FIG. 2, there is shown a cross-sectional view of the upper end of the raking drive system shown in the encircled broken line area designated by the letter "A" in FIG. 1. As shown a worm screw threaded shaft 80 is axially disposed within cylindrical rake boom member 24 and is supported at its drive end by an anti-frictional bearing device 82. Shaft 80 has a remote end 84 that carries a coaxially disposed surflex coupling member 85 which enables shaft 80 to be effectively coupled to hydraulic drive motor 76 shown in FIG. 1. A support tube ring 86 is disposed between a coupling device enclosure 88 and connected thereto by flange member 90 of enclosure 88. Antifriction bearing support device 82 is bolted to support flange 86 by means of a bearing housing member 92 at cylindrical flange 94 thereof utilizing a plurality of bolt assemblies 96, only one of which is shown in the drawing. Outer cylindrical rake boom member 24 is bolted to support tube ring flange 86 by a plurality of bolt assemblies 98, only one of which is shown in the drawing. As can readily be seen, support ring 86 has a pair of parallel square bar members 100 which are fixedly connected thereto in slots 102. A plurality of spaced apart support rings 104, only one is shown, are fixedly disposed along the length of square bar members 100 and 101 to thereby form a ridged cage structure. Bar members 100 and 101 function as tracks for cam-followers which are connected to the remote end of shaft 80 and will be discussed hereinbelow in connection with FIGS. 3 and 4.

Antifriction bearing device 82 merits discussion at this point owing to its uniqueness in operation and construction. As can be seen in FIG. 2, the device comprises bearing housing member 92 which is of rugged construction so as to hold the drive end of shaft 80 in axial alignment in support of rotating shaft 80 which may be longer than twenty feet in length. In order to meet the requirements for smooth and efficient repetitious reversal rotational action, there is provided a pair of coaxially spaced apart antifriction bearings 104 disposed between an inner bore 106 of bearing housing 92 and a reduced diameter section 108 of shaft 89 and spaced apart cylindrical member 110 and 112. A third spacer 114 fills the space along shaft section 108. The foregoing components are held in snug fitting contact by lock nut spring 116 and a nut 118 screwed at the end of reduced diameter shaft section 108. In addition, an end cap member 120 has an outer diameter coaxial cylindrical section 122 which fits snugly into inner bore 106 of housing 92 at one end and at the other end is disposed a second end member which fits snugly into the inner bore of housing 92.

End cap 120 has a coaxially disposed first oil seal 126 in an axial opening 128 formed therein, and second end member 124 has a second oil seal 130 disposed in an axial opening 132 formed therein. As shown housing 92 and spacer 110 have a lubricating opening 134 therethrough so that a lubricant may be applied to bearings 104. As shown in FIG. 2, coupling enclosure 88 has an end plate 136 with an axial opening 138 therein for receiving the drive shaft of hydraulic drive motor 76 shown in FIG. 1, to provide the rotational drive to shaft 80.

Figure 3:
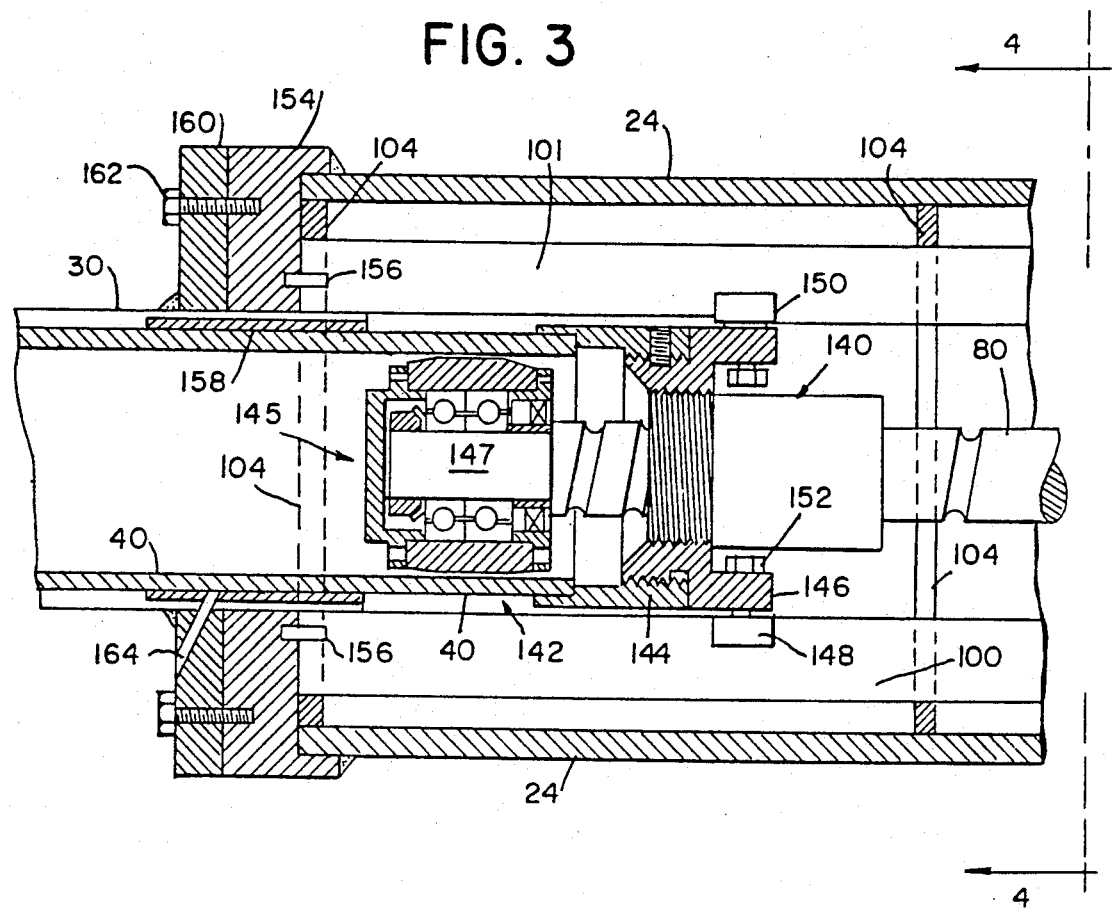
FIG. 3 is a cross-sectional view of the raking system shown in FIG. 1, in the encircled broken line area designated by the letter "B" therein, showing the rake end of the enclosed ball screw device connected to the enclosed boom end of the system.

Referring now to FIG. 3, there is shown a cross-sectional view of the system shown in FIG. 1, in the encircled broken line area designated by the letter "B" therein, the rake end of an enclosed threaded screw nut-like device 140 engaging a remote rake end of shaft 80. As shown in FIG. 3, threaded screw nut-like device 140, commonly referred to as a Sagnaw Nut, engages shaft 80 coaxially which enables it to traverse a preselected threaded length of shaft 80 as the shaft rotates about its axis. Nut device 140 is connected to an enclosed drive end 142 of ram 40 by a coaxial cylindrical member 144 welded to drive end 142 of ram 40. A cam-follower structure 146 having first and second pair of cam-follower rollers 148 and 150, respectively are in spaced apart parallel fixed space relationship attached to structure 146 which is coaxially disposed in fixed spaced relationship with cylindrical member 144 and nut-like device 140. The first pair of rollers 148 are guided along first square bar member 100 and the second pair of rollers 150 are guided along second square bar member 101. A plurality of nuts and bolts 152 are used to hold rollers 148 and 150 in place and to lock nut-like device 140 in place in cam-follower structure 146.

Continuing with the description of FIG. 3, it can be seen that rake boom member 24 is terminated at a cylindrical flange member 154 that has first and second square bar members 100 and 101 connected thereto by a plurality of metal dowel pins 156. Ram 40 extends coaxially through bearing support tube 30. A cylindrical bearing seal 158 is coaxially disposed at the entrance of tube 30 adjacent flange 154. As shown tube 130 has a cylindrical flange welded to its outer cylindrical surface which is held in fixed coaxial contact with flange 154 by a plurality of bolts 162. Flange 160 has at least one lubricant receiving port 164 which exits internally at bearing seal 158 for lubricating purposes.

Continuing with the description of FIG. 3, there is shown an antifrictional bearing device 145 supporting a reduced diameter end 147 of shaft 80. Bearing 145 is somewhat similar to bearing 82 shown in FIG. 2, at the opposite end of shaft 80, to provide support for the shaft. As nut 140 and cam-follower 46 traverse along bars 100 and 101, they move ram 40 up or down. Bearing 145 rides along the inner bore of ram member 40 during up or down motion.

Figure 4:
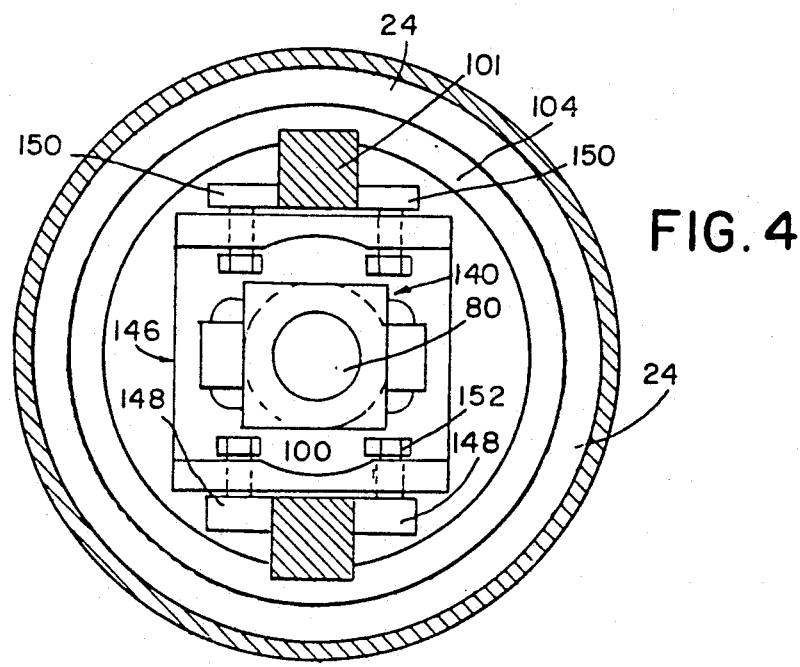
FIG. 4 is a cross-sectional view of the ball screw device in FIG. 3, taken along lines 4—4 of FIG. 3.

Referring now to FIG. 4, there is shown a cross-sectional view of the device shown in FIG. 3, taken along lines 4—4. As shown in FIG. 4, the relative spaced apart relationship of the various members can more readily be seen for further clarity of the device's construction.

Figure 5:
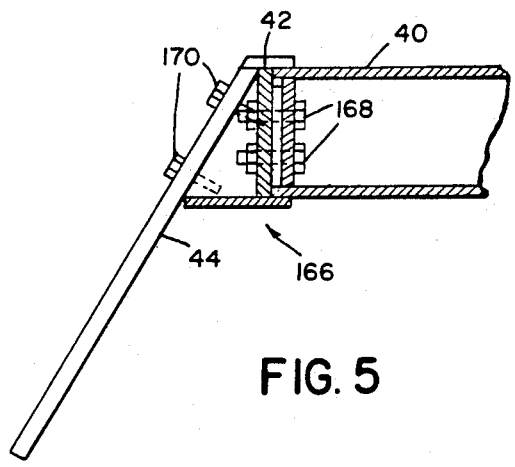
FIG. 5 is a cross-sectional view of the rake and external boom end shown in FIG. 1, depicted in the encircled broken line area designated by the letter "C" therein.

Referring now to FIG. 5, there is shown a cross-sectional view of the rake and external boom end shown in FIG. 1 depicted in the encircled broken line area designated by the letter "C" therein. As seen in FIG. 5, ram 40 is connected to an end cup 166 to which rake holder 42 is connected by means of a plurality of bolts 170, the combination of these parts provide the means whereby rake blade 44 is displaced upwards along the length of rake-gate 48 for collecting and removing debris which may be trapped thereon.

Figure 6:
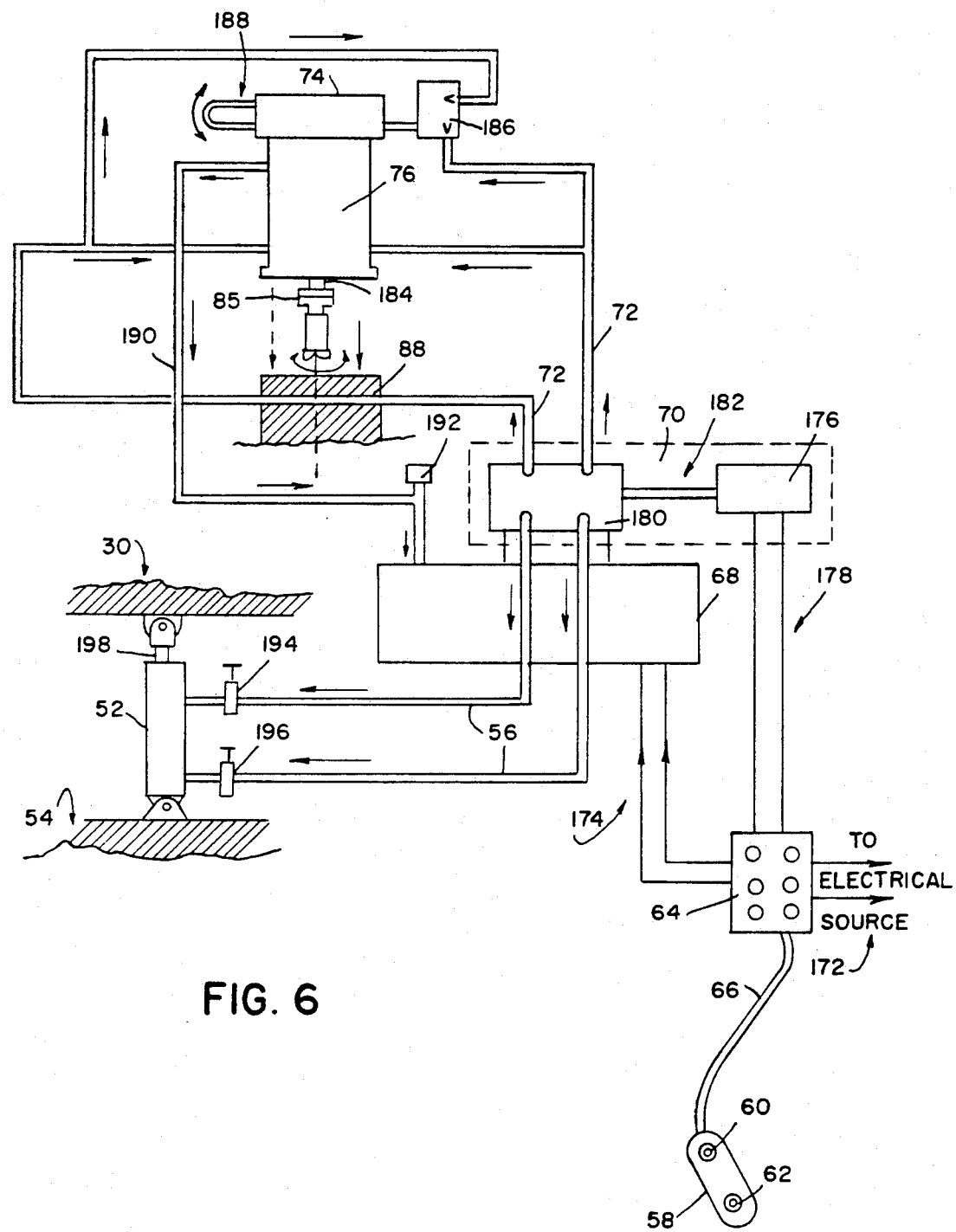
FIG. 6 is a schematic drawing of the hydraulic piping system with connections to an electrical controller panel shown with connection to an electrical controller panel shown in FIG. 1 within the encircled broken line area designated by the letter "D" therein.

Referring now to FIG. 6, there is shown a schematic drawing of the hydraulic piping system with its connections to electrical controlled panel 64 shown in FIG. 1 within the encircled broken line area designated by the letter "D" therein. As shown in FIG. 6, controller 64 is connected to an electrical power source along electrical conductors 172. Electrical power and control signals are fed to hydraulic fluid source device 68 along conductors 174 to a fluid motor pump 176 of hydraulic pumping system 70 along conductors 178, and to hand held electrical control switching device 58 along conductors 66, to thereby enable device 58 to manually control operation of bar screen raking system 10. As shown, pump motor 176 is connected to a fluid flow distribution and response device 180 along hydraulic connection 182 to thereby provide systematic hydraulic fluid flow to the various sections of system 10 in response to control signals resulting inputs from hand control device 58 during manual operation or from controller 64 during automatic preprogrammed signals originating therefrom.

To continue with the description of FIG. 6, hydraulic fluid is fed to hydraulic drive motor 76 at opposite sides thereof, one side for clockwise rotation and on the opposite side for counter-clockwise rotation. Brake 74 is mechanically connected to a drive shaft of motor 76 and receives fluids from either side of hydraulic lines as such fluid is fed to motor 76 which first passes through a hydraulic force shuttle check device 186 that works in combination with a feedback loop 188 connected to brake 74 to thereby effectuate braking action on motor shaft 184 in a time sequential manner.

Further, it can be seen that the relative space relationship of drive motor 76 to coupling device enclosure 88 into which drive shaft 184 extends so as to be coupled to worm screw threaded shaft 80 to effect responsive direction and speed of rotation thereof. A hydraulic fluid return path is provided through a hose line 190 from motor 76 to fluid source 68 and venting means 192 is along the line to provide means for fluid or vapor to escape which may occur during extended periods of uninterrupted operation of system 10.

Also shown in FIG. 6 is a depiction of hydraulic piston rod cylinder 52 which is connected at one end to bearing support tube 30 and at the other end to support plate 54. In a somewhat similar manner as with motor 76, fluid to cylinder 52 is supported along hoses 56. Prior to their connection to cylinder 52 a hydraulic flow control devices 194 and 196 are inserted along the fluid flow paths to permit more precise control of line flow and response. Fluid pressure exerted along one line causes a piston rod 198 of cylinder 52 to be extended outwardly therefrom, while pressure exerted along the other line causes said piston to be retracted into the cylinder, such motions cause boom tube 30 to be displaced in and out with respect to support plate 54 of support structure 12 which is firmly anchored and fixed.

Figure 7:
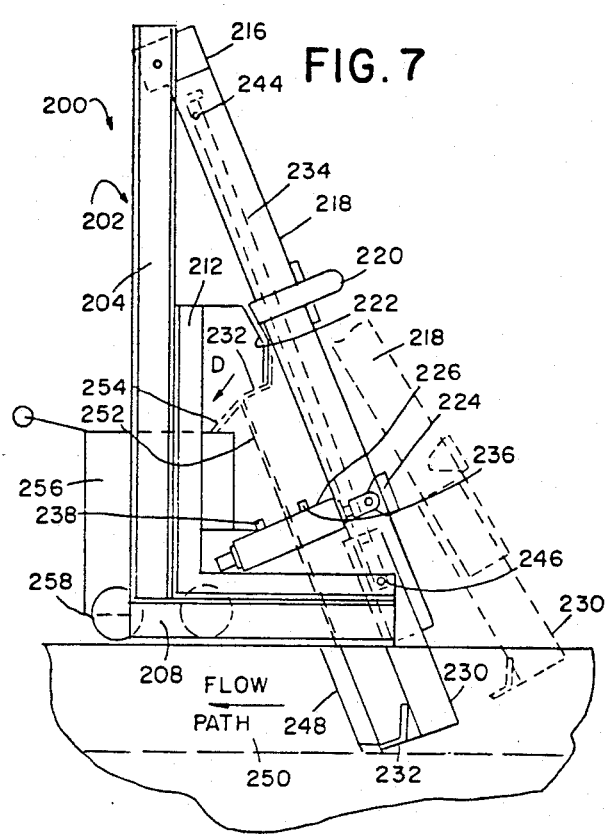
FIG. 7 is a pictorially illustrated side view of a second embodiment of a bar screen raking system illustrating its installation for full operation in a typical in-house operation, as an example.

Referring now to FIG. 7, there is shown a pictoral side view of a second embodiment of a bar screen raking system 200 illustrating a system useful for in-plant operation. As shown, there is support structure 202 having parallel vertical members 204 an 206 respectively connected to parallel horizontal members 208 and 210 that are firmly anchored to a ground level foundation. The horizontal and vertical connected members form a first and second "L" shaped frame. Each "L" frame is supported by a side frame and apron as bracing structures 212 and 214, respectively.

Near the top spaced apart ends of members 204 and 206, is a boom arm support member 216 that is pivotically disposed therebetween and fixedly connected to a boom arm member 218 which may extend downward on an incline to near ground level. At about a midway point along the length of boom arm 218 there is connected a pivotable scraper blade mounting device 220 and a scraper blade 222 connected thereto. At still a lower position along the length of boom arm 218 is a boom piston connection plate 224 that has a first hydraulic piston rod cylinder 226 and a second cylinder 228 connected at each of their piston moving ends at fixed spaced apart positions of said boom connection plate 224. A non-piston moving end of cylinders 226 and 228 are connected to support structures 204 and 206, respectively, to thereby provide lateral displacement of boom 218 in and out.

Continuing with the description of FIG. 7, there is shown a rake carriage device 230 disposed at the lower end of boom arm 218 carrying a rake 232. Internal to boom arm 218 is disposed a long hydraulic piston cylinder 234 shown in broken lines and is operatively coupled to rake carriage device 220. Each of the hydraulic cylinder devices 226, 228 and 234 have hydraulic input and output connection ports 236 and 238 for cylinder 226, ports 240 and 242 for cylinder 228 and ports 244 and 246 for cylinder 234, respectively.

A rake-grate or screen 248 is disposed in a flow path of water carrying channel 250 extending downward along an incline below ground level. As shown, rake 248 extends to the bottom of channel 250. Connected to the upper end of screen 248 is an extension thereof is a rectangular plate 252 having a section 254 forming an acute angle therewith and directed in a downward direction. A debris bin 256 having a plurality of rotatable wheels 258 is disposed in close spaced apart relationship to section 254 of plate 252 to provide means for receiving debris collected by rake 232 during its upward displacement movement along the length of rake-grate 248 and plate 252. Debris collected by rake 232 is caused to be discharged into bin 256 as a result of scraper or wiper blade 222 engaging rake blade 232 during its upward displacement motion as shown by its broken-line position at the upper end of plate 252 as can readily be seen in FIG. 7. As bin 256 becomes filled, it may be rolled out and emptied from time to time. The broken line depiction of boom arm 218 and rake carriage 230 represents a lateral displacement position therefor.

Figure 8:
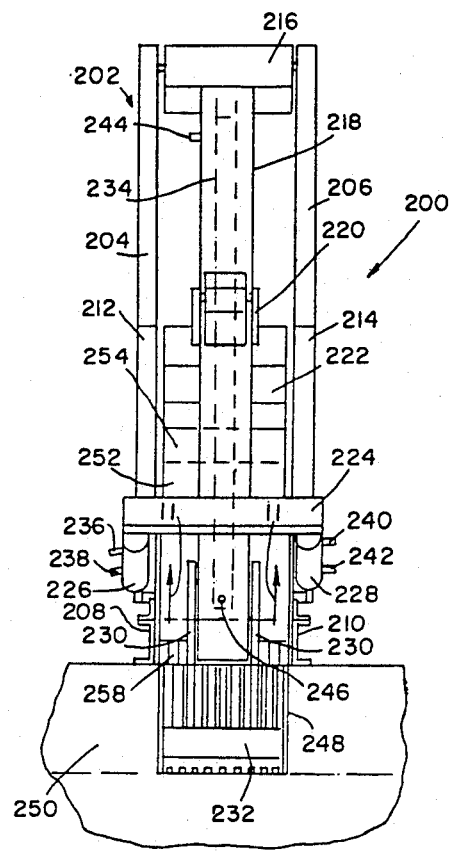
FIG. 8 is an illustrated front view of the bar screen raking system shown in FIG. 7.

Referring now to FIG. 8, the various relative space relationships of component parts of the system described with reference to FIG. 7 can more readily be seen and understood.

Figure 9:
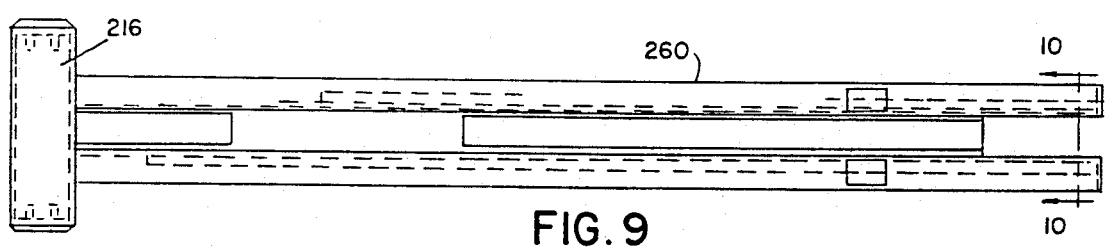
FIG. 9 is a view of a support boom structural member of the bar screen raking system shown in FIG. 7 and 8.
Figure 10:
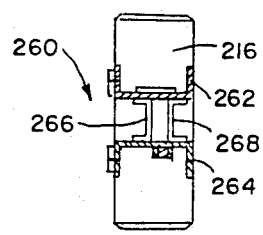
FIG. 10 is a cross-sectional view of the support boom structure shown in FIG. 9, taken along lines 10—10 of FIG. 9.

Referring now to FIGS. 9 and 10, there is shown an internal boom arm support member 260 that is fixedly connected to a rotatable support member 216. As shown in FIG. 10 support member 260 includes a pair of spaced apart parallel first and second "U" shaped members 262 and 264, respectively, connected by a pair of spaced apart parallel first and second "U" shaped members 266 and 268 respectively, which completes internal boom support member 260.

Figure 11:
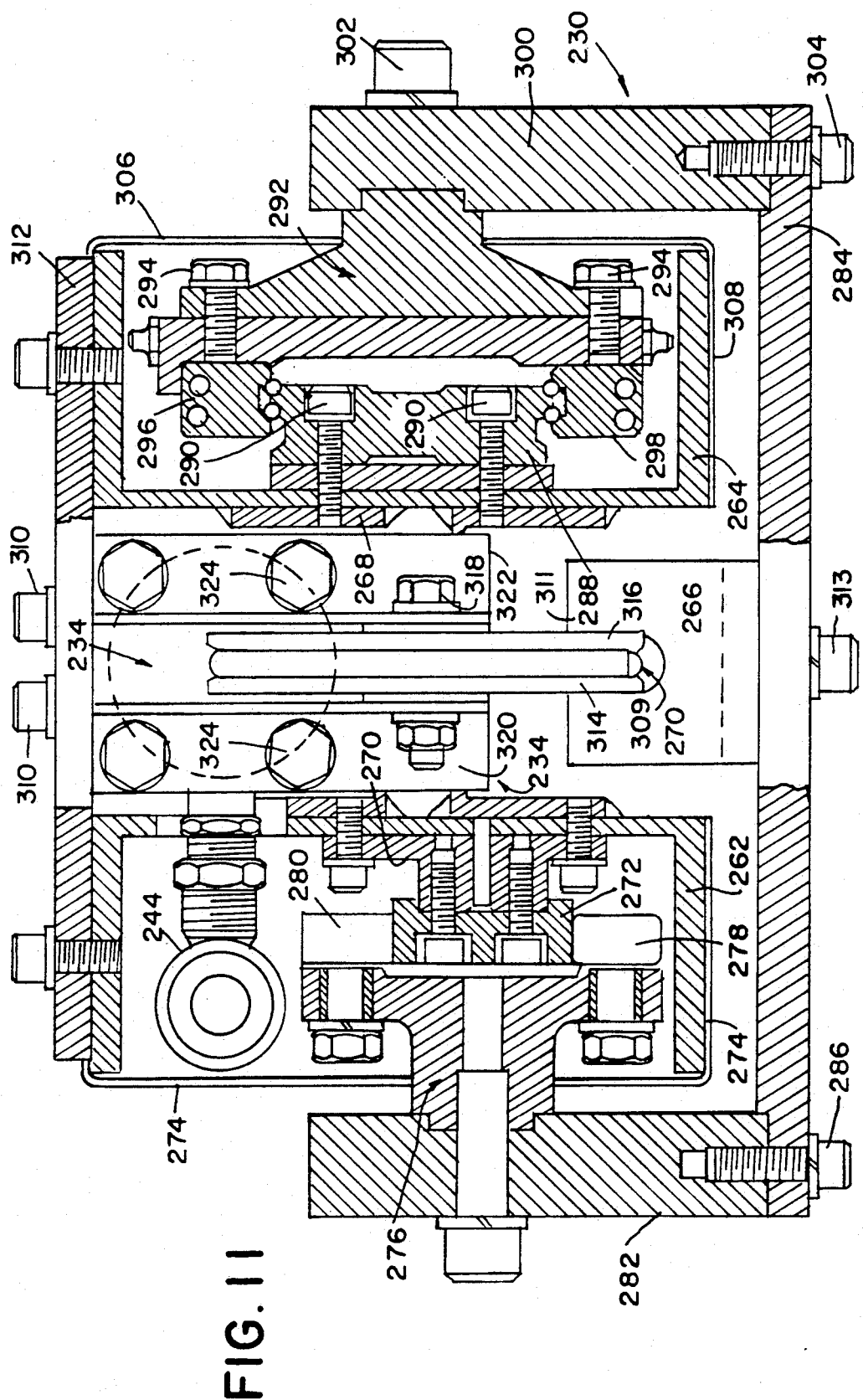
FIG. 11 is a detailed cross-sectional view of the boom and rake carriage shown in FIGS. 7 and 8, taken along lines 11—11 of FIG. 8 depicting the internal spaced relationship to one another and showing the bearing slide carriage, cam-follower and hydraulic drive cylinder devices for actuation of the up and down motion for the raking system.

Referring now to FIG. 11, there is shown a detailed partial cross-sectional view of boom arm 218 and rake carriage device 230 taken along lines 11—11 of FIG. 8. As shown, internal boom arm support member 260 includes components 262, 264, 266 and 268 which are stationary members. Attached to member 262 is a cam-track support 270 and a cam-follower track 272, both of which extend substantially the length of boom arm 260. A boom cover 274 is connected to U-shaped member 264 of boom arm 230 to protect the moving parts enclosed thereby. Enclosed within an enclosure formed by cover 274 and first U-shaped member 262 is a moveable cam-follower support 276, including a first plurality of cam-follower wheels 278 disposed along a first side track 272 and a second plurality of cam-wheels 280 are disposed along a second side track 272 parallel with wheels 278. Cam-follower 276 is fixedly connected to a side member 282 of displaceable rake carriage device 230 that is in turn bolted to a main support plate 284 of device 230 by a plurality of spaced apart bolts 286 disposed along the lengths thereof. Cam-follower support 276 provides displacement motion stability to the up and down movement of rake carriage device 230 as it traverses track 272.

Continuing with the description of FIG. 11, there is a bearing track device 288 bolted to second U-shaped member 264 by a plurality of cap screws 290 in spaced apart relationship along its length. A bearing slide carrier 292 is connected by a plurality of bolts 294 to a first anti-frictional linear motion duplex-angular type bearing 296 and a second bearing 298 that is disposed in spaced apart parallel relationship to one another and oppositely disposed along bearing track device 288. Bearing slide carriage 292 is fixedly connected to rake carriage device 230 by means of a side plate member 300 through a plurality of bolts 302 which is in turn bolted to main support plate 284 by a plurality of bolts 304.

U-shaped member 264 has two cover members 306 and 308, respectively, enclosing bearing slide carriage 292. Since carriage 292 and rake device 230 are fixedly connected, rake device 230 is readily and efficiently displaced up and down along the tracks of device 288 on anti-friction bearings 296 and 298 by means of a hydraulic piston cylinder 234 which activates a cable 309 that is fixedly connected to an internal piston member of cylinder 234. Cable 309 is connected to a U-shaped bracket 311 which is in turn fixedly connected to main support plate 284 by at least one bolt 313. Hydraulic piston cylinder 234 is mounted in fixed position by a plurality of bolts 312 which is in turn fixedly connected to U-shaped members 262 and 264. Cable 309 is supported by a pair of cicular sheaves 314 and 316 that are held in rotatable space relationship by a bolt arrangement 318. Bolt arrangement 318 is carried by a first L-shaped mounting bracket 320 and a second L-shaped mounting bracket 322 both of which are connected to an outer casing of cylinder 234 by a set of four mounting bolts 324. A similar cable and sheave support arrangement is provided at the other end of cylinder 234 to maintain the cylinder in fixed spaced relationship within the boom structure.

Figure 12:
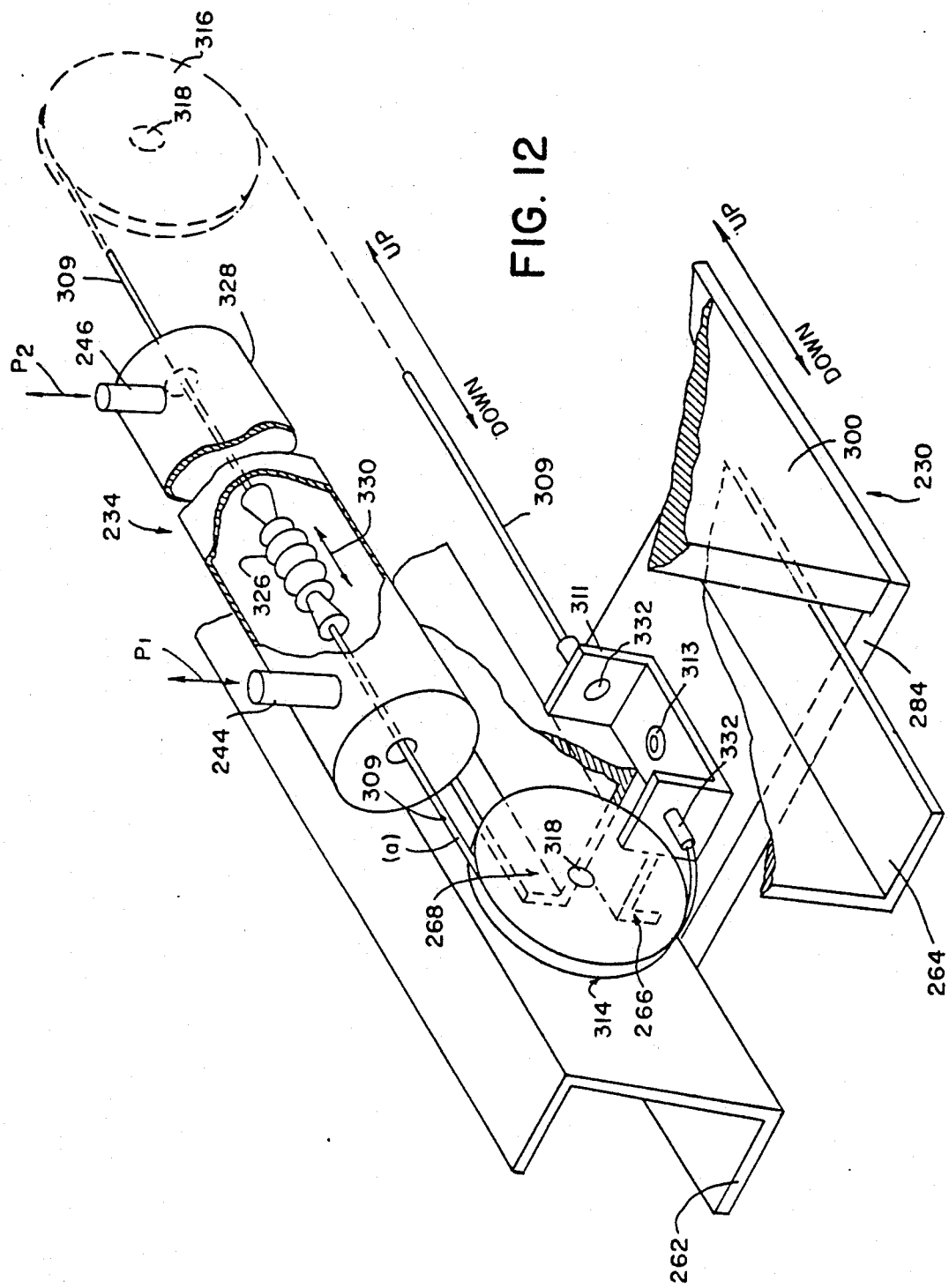
FIG. 12 is a pictorial sketch of the hydraulic drive cylinder shown in FIG. 11 illustrating the cable drive connection to the rake carriage which moves the rake up and down responsive to the cable driven by the hydraulic cylinder.

Referring now to FIG. 12, there is shown a partial perspective view of rake carriage device 230, shown in FIG. 11, illustrating the relative space relationship of the various components of the raking system of the second embodiment so that the novel up and down displacement motion of rake carriage 230 can more readily be understood and appreciated. As shown in FIG. 12, hydraulic piston cylinder 234 extends along the length of U-shape members 262 and 264 in substantial parallel spaced relationship and has cable 309 connected at opposite ends of an internal piston member 326 that moves axially back and forth within a cylindrical enclosure 328 of cylinder 234 as indicated by a two headed arrow 330 near piston 326, in response to hydraulic fluids entering and exiting ports 244 and 246. Each section of cable 309 is connected to opposite ends of piston 326 and the other ends thereof are, respectively fixedly connected to opposite legs of bracket 311 by suitable cable fasteners 332 as they each pass around their respective sheave arrangements 314 and 316. The resulting arrangement creates a continuous loop path between the two sections of cable 309, piston 326 and bracket 311. As can now readily be seen from FIG. 12, since bracket 311 is fixedly mounted to main support plate 284 of rake carriage device 230, the carriage will respond in a direction opposite to the motion of piston 326. For example, if hydraulic fluid pressure is applied to cylinder 234 through hydraulic port 246, piston 326 will move toward bracket 311 and bracket 311 will move to piston 326. If fluid pressure is applied to cylinder 234 through port 244 piston 326 will move away from bracket 311 while pulling a section (a) of cable 309 with it causing bracket 311 and connected main support plate 284 to move in a direction opposite from piston 326. Thus, a resulting back and forth motion of the boom carriage device as piston 326 is actuated by the flow of fluids under pressure in the hydraulic actuation system. As shown in FIG. 12, the hydraulic fluid flow into and out-of fluid ports 244 and 246 may be in either direction, e.g. in or out as indicated by the double headed arrows P1 and P2, respectively, near such fluid ports.

The cylinder 234 in actual use in the raking system of this second embodiment of the present invention may be ten or more feet in length in order to accommodate a carriage stroke of such length. The novel arrangement taught by the present disclosure for up and down displacement of rake carriage device 230 can be readily understood and appreciated when it is realized that rapid and precise direction and distance of travel can easily be accomplished by means of automated hydraulic fluid system such as that shown in FIG. 6, when it is adapted to provide the necessary hydraulic fluid flow to cylinder 234 by means of a controller such as controller 176 or by hand held electrical control device 58. The lateral in and out motion of boom 218 may also be controlled by a system such as that shown in FIG. 6, by providing two sets of feed lines 56 for actuation of hydraulic piston rod cylinders 226 and 228, shown in FIG. 8.

Figure 13:
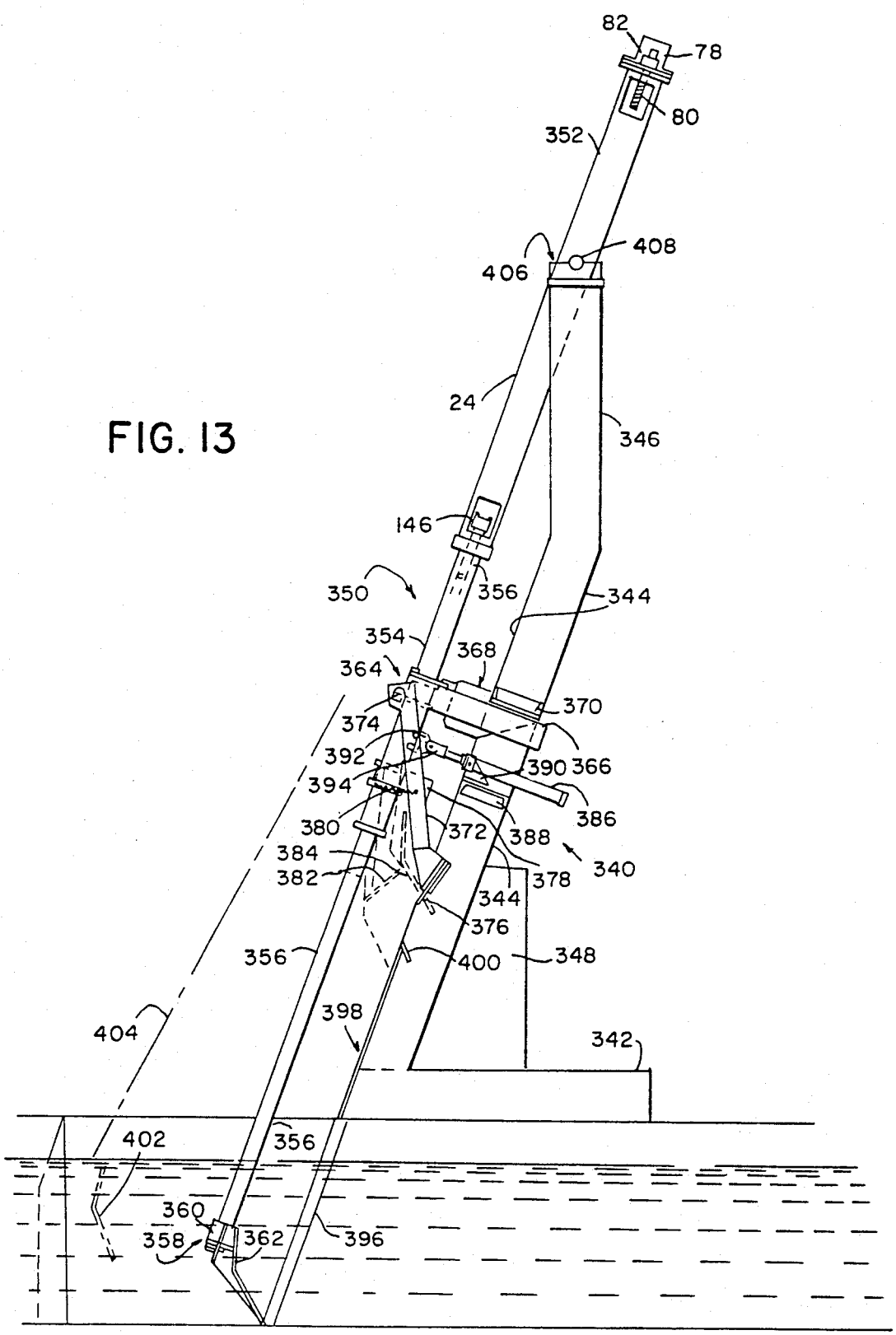
FIG. 13 is a pictorial side view of a bar screen raking system similar to the system shown in FIG. 1, having another structural embodiment of the invention, illustrating an alternative support structure and debris removal arrangement, as an example.

Referring now to FIG. 13, there is shown a pictorial side view of another structural embodiment of the bar screen raking system shown in FIG. 1, which has a support frame 340 consisting of a pair of horizontal base support members 342, a pair of connected vertically inclined section members 344, a pair of vertical top member sections 346, and a pair of lower bracing plate members 348 connected to members 342 and 344 to provide strutural support to the entire structural frame 340 required to provide overall support for pivotally supporting a boom arrangement 350. Only one of each of members 342, 344, 346 and 348 are shown in FIG. 13. Boom arrangement 350 includes an upper cylindrical boom section 352, a coaxial bearing support tube section 354, a coaxial ram section 356 which is connected at its lower remote end to a rake holder arrangement, consisting of a rake holder 360 for holding a rake 362. Members 352, 354, 356, 360 and 362 correspond to or are equivalent to members 24, 30, 40, 42 and 44 shown in FIG. 1.

Connected to bearing support 354 is a scraper support device 364 having a pair of parallel plates 366, only one is shown, extending perpendicular to bearing support 354 to a distance beyond vertically inclined members 344. A pair of spaced apart guide plates 368 are connected to vertically inclined members 344 by a pair of brackets 370, only one is shown, and is disposed in a manner so as to restrict the horizontal motion of plates 366 which act as a stabilizing means for boom arrangement 350 along its extensive length, which may be as long as twenty feet. Connected to scraper support device 364 is a scraper arm 372 which is pivotally connected at its upper end 374 and extends at an incline vertically downward and has a scraper blade member 376 connected to the remote end of arm 372. Scraper arm 372 is disposed between a pair of guide plates 378, only one is shown, which restricts the lateral movement of arm 372. A spring device 380 is connected between scraper arm 372 and one of the guide plates 378 to hold scraper blade 376 in constant contact along the angular surface of rake 362 when they meet as ram 356 moves upwards to the position where collected debris is discharged by scraper blade 376. As shown by the broken-line 382 of the scraper arm arrangement 372, the scraper arm resides closer to the ram 356 when the boom is at the bottom of the raking stroke and rides to the lower end of rake 362 at the upper stroke position of rake blade 362 as shown by a broken-line depiction of blade 384, its position in up stroke position.

Continuing with the description of the system a hydraulic piston rod cylinder 386 is connected between vertically inclined member 344 and bearing support 354. Cylinder 386 is connected to member 344 by means of a mounting bracket 388 and a pivotal support member 390 and to bearing support 354 by means of a pivotal connection plate 392 at an end of cylinder 386 by a cylinder piston end 394. Extending from the water channel shown, there is a rake-grate or screen 396, which extends vertically along an incline to ground level and continuing therefrom is a rake plate 398 extending along the same vertical incline path a preselected distance where it is terminated by a reverse incline lip section 400 where the two sections-intersect. The rake plate 398 and lip section 400 are fixedly connected to support members 344 as shown. The entire raking system is supported at ground level as shown, while the ram 356 and attached rake assembly 358 extend into the water channel reaching its bottom when fully extended. Broken-lines 402 and 404 illustrate the position of the ram and rake at the end of a down stroke and with cylinder 386 fully extended.

The entire boom is supported by a trunion pivotal support arrangement 406 and by means of a support means 408 rotatably connected thereto. Thus, the entire boom device is supported at two points along its entire length, namely, support 408 and connection plate 392. The support members of the system are of rugged construction so as to enable them to support the boom arrangement during operation of the system for many cycles.

Completion of the description of FIG. 13, is done by noting that bearing device 82, coupling device 78, worm screw threaded shaft 80 and cam-follower 146, which are depicted in FIG. 13, are all the equivalent to those components shown and described in FIGS. 1-4, hereinbelow.

In operation, both embodiments of the present invention, use an electrical/hydraulic system of the type shown and described with reference to FIG. 6. As such these systems are adaptable to more universal and cost effective uses thereby enhancing the novel features of the present invention.

As has been clearly disclosed, the mechanical construction and operation of the two embodiments are individually different, however, both provide novel approaches for the solution to long standing prior art problems not heretofore resolved. For example, a programmable computer microprocessor included with the control and power source 64 enables source 64 to receive, process and send signals within the system to control a variety of systems functions and sequences automatically or manually. If, for example, during operation of the system, the rake of either embodiment encounters a large object lodged in the rake-grate or screen, a signal indicating that the rake has encountered an object which prevents the rake from moving in a smooth uninterrupted stroke is fed to control 64, which upon receipt of such signal is programmed to over-ride the object by sending a signal to other sections of the system that cause the boom to move laterally outwards thereby avoiding the object and to return to its previous rake-to-grate position along its upward stroke. Alternatively, control 64 may be programmed to shut down the system completely immediately or after an over-riding event, whereupon the object may be manually removed.

In closing, it is noteworthy to observe that the present invention provides a system in both embodiments that utilize only one active drive mechanism for providing rapid response of the system for displacing a raking device up and down a rake screen thereby eliminating numerous parts found in prior art devices which may be the cause of frequent down time events of the system.

Another advantage of the present invention is the provision of drive mechanisms which are not readily affected by harsh environmental conditions, such as icing-up of the active drive mechanism. This is especially so with respect to the worm screw threaded device utilized in the preferred embodiment.

It is understood that the above embodiments are only illustrative of the principles applicable to the present invention. Various modification and adaptations may be envisioned by those skilled in the art when exposed to the disclosure and teachings herein, without departing from the spirit and scope of the invention and the claims appended hereto.

What is claimed as new is:

1. An improved telescopical raking system for use in connection with a bar-screen of preselected length, disposed in an inlet water carrying flume, the improvement, comprising:

a. a support means having vertical and horizontal connected support members;

b. a rake boom arrangement, carried by said support means in an inclined vertical position, for lifting and lowering movement of said boom, said boom comprising, a cylindrical rake boom member pivotably connected and supported by said support means along its length, a bearing support tube member coaxially disposed and connected to a remote end of said rake boom member, a coaxially disposed telescopical ram extending from said remote end of said rake boom member downward into said water carrying flume, and a drive means coaxially disposed within said cylindrical rake boom member and connected to said ram near said remote end of said rake boom member for causing displacement of said ram up and down a prescribed distance along said bar-screen and terminating near an upper end of said rake boom member, said drive means comprises;

(1) a static support cage member fixedly and axially disposed within said cylindrical rake boom member extending along a substantial length thereof, said cage having a pair of fixed and axially spaced apart diametrically disposed parallel track members connected to a plurality of axially spaced apart ring members;

(2) a coaxially disposed screw-threaded shaft having a length substantially equal to said cage member and having drive and non-drive shaft ends and being supported at said drive end by an anti-friction bearing means connected to said cage and at said non-drive end by a second anti-friction bearing means which is in slideable contact within an inner bore of said ram member;

(3) a threaded nut means coaxially engaging said threads of said shaft and being connected to a cam-follower means for linear travel along said tracks of said cage, said nut and said cam-follower being fixedly connected to one another and to an internal end of said ram;

(4) a hydraulic motor and coupling means connected to said drive end of said shaft for effectuating axial rotation thereof in either clockwise or counter-clockwise motion to thereby cause said threaded nut and cam-follower to move back and forth along said threaded shaft while simultaneously causing said ram connected thereto, to be telescopically displaced in an up and down motion along said length of said rake screen;

c. a rake comb member connected to said ram at an end of said ram extending into said water flume for the collection of debris as said rake comb is displaced upwards while in contact with said bar-screen;

d. a scraper means for removing debris collected by said rake comb as said rake comb makes contact with said scraper as said rake travels along an upward debris collection stroke;

e. a piston rod cylinder connected between said support means and rake boom for providing pivotal movement therebetween producing lateral displacement between said rake boom and said vertical support member;

f. hydraulic drive means connected externally to said boom for actuating said ram in up and down displacement motion between said boom and said vertically mounted support member and for actuating said piston rod cylinder to produce said lateral displacement; and g. electrical control means for controlling said hydraulic drive means.

2. An improved telescopical raking system of claim 1 which includes an external hydraulic drive means for controlling and actuating said hydraulic motor and a braking means for stopping axial rotation of said shaft to facilitate a reversal of rotational motion of said shaft.

3. An improved telescopical raking system of claim 2 in which, said hydraulic drive means includes a hydraulic fluid source, a fluid pumping system and a system hose arrangement.

4. An improved telescopical raking system of claim 3 in which, said electrical drive means includes an electronic programmable computerized circuit means for producing preselected sequentially programmed actuation and control signals to said hydraulic drive means for operation of said raking system.

5. An improved telescopical raking system of claim 3 in which, said track members are square bars.

6. An improved telescopical system of claim 5 in which said static support cage member includes a support ring member connected to a first flange of said cylindrical rake boom member and to one end of the pair of parallel spaced apart bars that are fixedly connected to an inner bore of a plurality of spaced apart ring members, the spaced apart bars being connected to another support ring at a second end of the parallel bars, said another support ring having a plurality of axially disposed spaced apart positioning pins extending axially therefrom, for engaging a second support flange of said cylindrical rake boom member, to thereby fix said cage coaxially within said upper static boom member.

7. An improved raking system of claim 6 in which, said cam-follower includes a rectangular-like support member having a pair of spaced apart rotatable wheels disposed in parallel spaced apart relationship to one another on opposing sides of said support member, for wheel riding engagement with said parallel track members of said cage.

8. An improved raking system of claim 1 in which, said scraper means for removing collected debris includes a scraper arm with a first and second end, a scraper blade being connected at said first end thereof and said second end of said scraper arm being rotatably connected to said bearing support tube member, and said scraper arm having a spring means connected between it and said bearing support tube member for holding said scraper blade in tension contact with said rake member to thereby remove debris therefrom during an up stroke of said raking system.

9. An improved telescopical raking system for use in connection with a bar-screen having a preselected length disposed substantially vertically in an inlet water carrying flume, the improvement, comprising:

a. a support means having vertical and horizontal connected members;

b. a rectangular rake boom arrangement carried by said support means for lifting and lowering movement of up and down strokes respectively, said boom comprising a boom arm member rotatably supported and connected to said support means and a lower moveable telescopical member having an axially disposed rake arm carriage means relative to said boom arm and drive means disposed axially and connected to said rake arm carriage means and rake boom for effecting up and down displacement thereof along said length of said bar-screen and terminating at the end of an up stroke of said boom, said boom arm member includes an axially disposed beam arrangement consisting of two parallel U-shaped sections connected by a pair of parallel and perpendicularly disposed spaced apart U-shaped sections fixedly disposed therebetween;

c. a rake comb member connected to a remote end of said rake arm carriage means for displacement up and down said length of said bar-screen while in contact therewith for collection of debris thereon;

d. at least one piston rod cylinder means connected between said support means and said boom arm member for providing rotatable movement therebetween for producing lateral displacement between said boom arm member and said vertically mounted support member; and e. means for removing debris collected from said bar-screen at said end of said up stroke of said boom rake arm.

10. An improved raking system of claim 9 in which, said rake arm carriage means includes a carriage bearing means operatively and fixedly disposed on one side of said beam arrangement and a cam-follower means operatively and fixedly disposed on another side of said beam arrangement parallel to said carriage bearing means, said carriage bearing means and said cam-follower means operate in combination to provide stable and efficient movement of said telescopical rake arm member up and down said beam arrangement of said rake boom.

11. A improved raking system of claim 10 in which, said drive means consists of a hydraulic piston actuated cylinder, said piston and cylinder each having corresponding first and second ends, said cylinder is ridgedly connected to said beam arrangement along the length thereof, a pair of cable members each having first and second ends, and each end of said piston is connected to the first end of said cable members and each cable member extends from said piston through said corresponding ends of said cylinder through leak proof cable aperture at each cylinder end, the second end of said cable members being externally connected to a U-shaped bracket member that is in turn connected to a fixedly disposed carriage member for providing up and down displacement of said carriage member responsive to hydraulic pressure exerted upon said cylinder and said internally disposed piston, said hydraulic pressure being exertable at either end of said cylinder to thereby produce said up and down motion of said rake arm.

12. An improved raking system of claim 11 which includes hydraulical drive means for actuating said hydraulic-cable actuated cylinder and said at least one piston rod cylinder means, and electrical control means for controlling said hydraulic drive means.

13. An improved telescopical raking system of claim 12 in which, said electrical control means includes an electronic programmable computerized circuit means for producing preselected sequentially programmed actuation and control signals to said hydraulic drive means for operation of said raking system.

* * * * *